Aug. 14, 1956 J. K. ROSE 2,759,178

CABINET

Original Filed Feb. 11, 1947 3 Sheets-Sheet 1

Inventor,
Joseph K. Rose,
By: Benjamin Schlosser
Atty.

CABINET

Original Filed Feb. 11, 1947

Inventor,
Joseph K. Rose.
Benjamin Schlosser Atty.

Aug. 14, 1956 J. K. ROSE 2,759,178

CABINET

Original Filed Feb. 11, 1947 3 Sheets-Sheet 3

Inventor,
Joseph K. Rose,
By: Benjamin Schlosser
Atty.

2,759,178

CABINET

Joseph K. Rose, Chicago, Ill.

Original application February 11, 1947, Serial No. 727,792, now Patent No. 2,627,067, dated January 27, 1953. Divided and this application May 15, 1952, Serial No. 287,949

11 Claims. (Cl. 340—369)

This invention relates to a cabinet or housing adapted for use with any type of television receiver, oscilloscope, slide viewer, or any other type of image exhibiting device with self-contained viewing means, and particularly to means for shielding the image exhibiting member from extraneous light.

The present application is a division of my prior application Serial No. 727,792, filed February 11, 1947, which issued as Patent No. 2,627,067 on January 27, 1953.

Images displayed on a viewing screen, as in a television receiver, can be viewed most perfectly when the eyes of the observer are near a line perpendicular to the center of the plane of the viewing surface of the image exhibiting member. Within a certain distance from this line viewing is considered satisfactory. This satisfactory viewing space in front of the image exhibiting member is contained within the confines of a truncated figure whose cross sectional area is approximately the same shape as the viewing screen, that is, rectangular with rounded corners. These sections become increasingly larger as the distance from the screen increases. The longitudinal axis of this truncated figure is the above mentioned perpendicular to the center of the image exhibiting member. When a light shield is used in conjunction with such an image exhibiting device it is desirable to shape it so as not to restrict the useful angle of vision contained within the satisfactory viewing space.

It is an object of this invention to provide a cabinet or housing with light shielding means which may be quickly and easily extended or moved into light shielding position without restricting the useful angle of vision relative to the image exhibiting member. It is a further object of this invention to provide a light shield that can be retracted into inoperative position within or upon the cabinet without detracting from the general cabinet appearance. A further object of this invention is to provide a light shield composed of members that may be expanded in one or more dimensions when they are moved into light shielding position. Other objects of this invention will become apparent upon reading the following description in conjunction with the accompanying drawings, in which:

Figure 1:
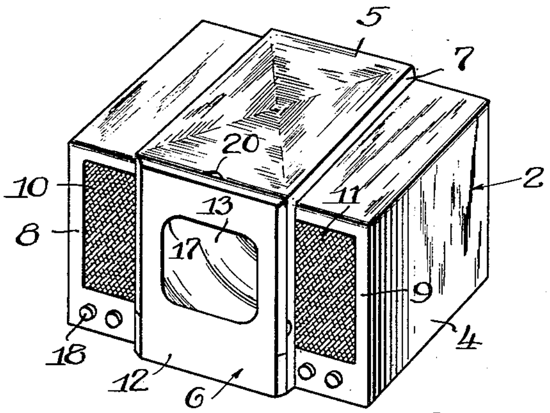
Figure 1 is a perspective view of a table model direct viewing type of television receiver embodying my present invention, with the lgiht shielding means in completely retracted position.

Referring to Figures 1 to 7 of the drawings, the reference numeral 2 indicates a cabinet for housing a television receiver. The cabinet illustrated is for a table model receiver, but it will be understood that the light shielding means that constitutes the present invention may be used with any type of television receiver, or any other image exhibiting device with self-contained viewing means.

The cabinet 2 includes a bottom wall 3, side walls 4, a top wall 5 and a front wall 6. The top wall has its center portion offset upwardly, as indicated at 7. The front wall 6 is divided into two side panels 8 and 9, having grills 10 and 11 positioned therein, and a central panel 12 which frames an image exhibiting member 13. The image exhibiting member is the flared end of a cathode ray picture tube 14. The flared end of the tube fits into a bezel 15 which is fitted into an aperture 16 in the front panel 12. The aperture 16 is substantially rectangular and has rounded corners 17. Control knobs 18 are on shafts extending through the side panels 8 and 9 below the grills 10 and 11.

The cathode ray picture tube is the only portion of the television apparatus shown. However, the cabinet houses a complete conventional television video and audio receiver assembly including a chassis and a speaker mounted in back of one of the grills 9 or 10.

In Figure 1 the cabinet is shown with light shields in retracted position. There is, as a result, no shielding of the viewing screen from extraneous light and the television images can be satisfactorily observed if the room is dark or dimly lighted.

Figure 2:
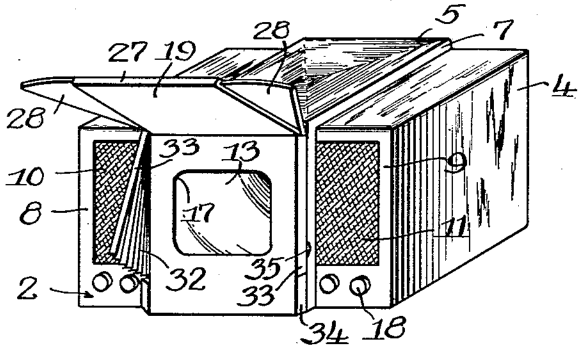
Figure 2 is another perspective view of the receiver shown in Figure 1 with the top light shield fully extended and one of the side light shields partially extended.

If there is any interfering external light coming from over the top of the viewing screen, the top light shield 19 may be grasped adjacent the finger notch 20 and pulled forwardly of the front panel 12, as shown in Figure 2. The top light shield extends outwardly at an angle of approximately 115 or 120° to the plane of the front panel. This wide angle permits the top light shield to shield the viewing screen from extraneous light without restricting the view within the useful angle of vision.

Figures 4, 5, 6, 7, 8, 9:
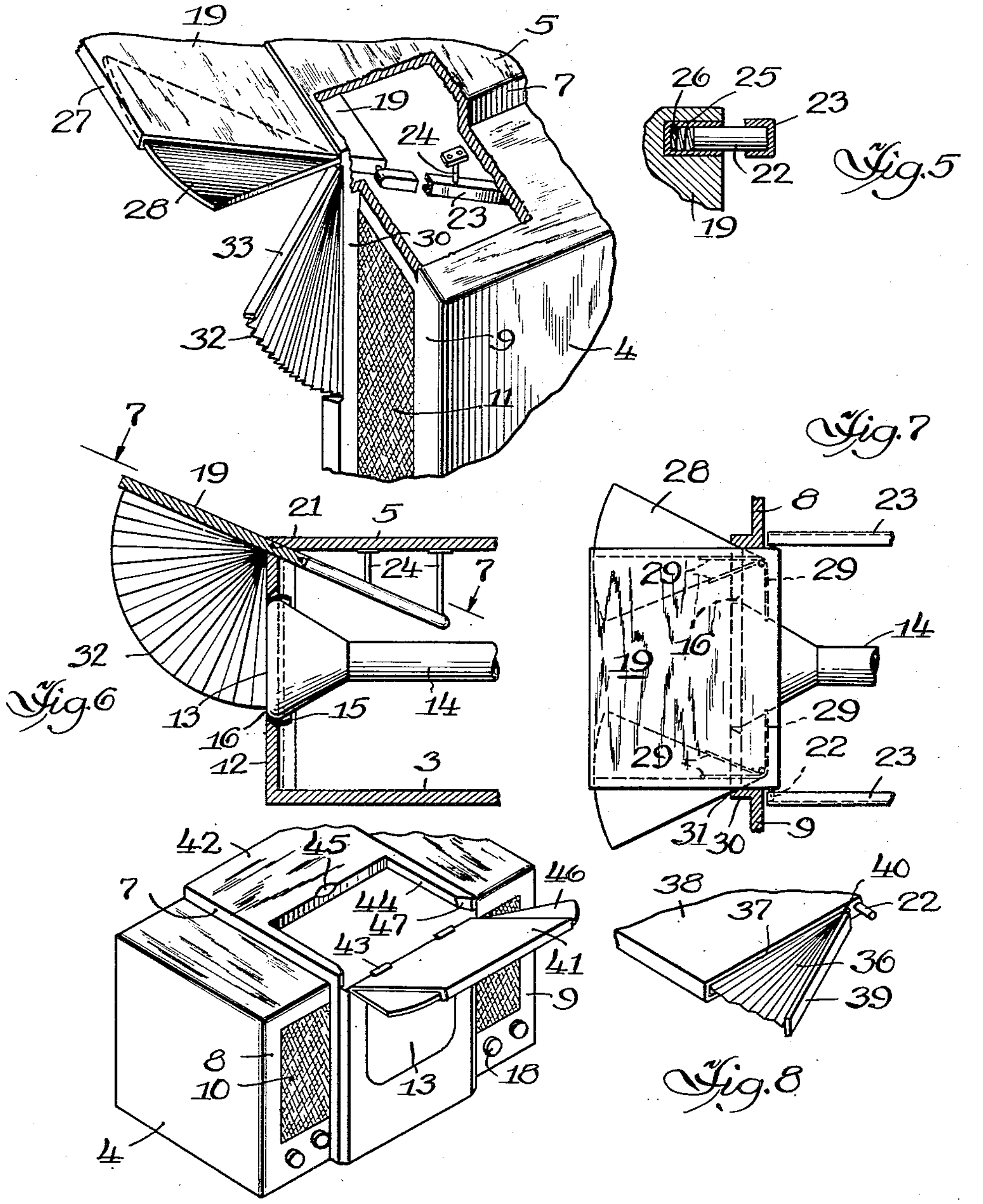
Figure 4 is a fragmentary perspective view of the receiver shown in Figures 1 to 3 with part of the top broken away to illustrate the method of mounting the top light shield in the cabinet.
Figure 5 is a detail sectional view of the structure for supporting the rear edges of the top light shield in the slide channels.
Figure 6 is a fragmentary sectional view showing the means for supporting the top light shield in extended position.
Figure 7 is a cross sectional view taken along the line 7—7 of Figure 6.
Figure 8 is a detail perspective view showing a modified form of lateral extension for the top light shield.
Figure 9 is a perspective view of a cabinet having a modified type of top light shield.
Figure 10:
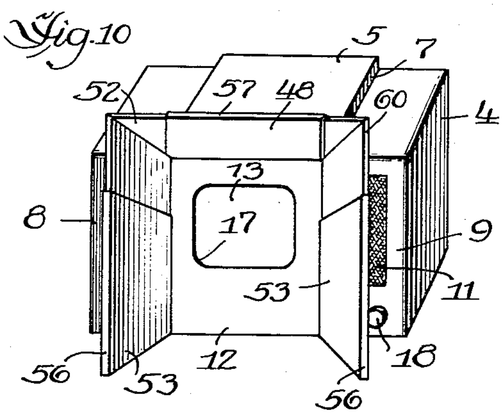
Figure 10 is a perspective view of another embodiment of the invention in which the side light shields are slidably mounted in guide channels secured inside the cabinet.

The top light shield extends through an opening between the top of the front panel 12 and the bottom of the front edge of the cabinet top which is beveled, as indicated at 21, Figure 6. It is supported by the front panel 12 and two rods 22 which extend from the rear of its sides into two channels 23, as shown in Figures 4 to 7, inclusive. The channels are mounted by means of brackets 24 secured to the inside of the cabinet top. The rods 22 are mounted in cups 25 embedded in the sides of the top light shield and coiled springs 26 are positioned in each cup between the bottom of the cup and the rod so as to urge the rods outwardly into the channels 23 as described more fully in my co-pending application Serial No. 714,305 filed December 5, 1946. The channels 23 extend upwardly at an angle of approximately 25 or 30° from the horizontal and the spring pressed rods 22 co-operate with the beveled edge 21 of the cabinet top and the top edge of the front panel 12 to support the top light shield in any extended position.

The front edge 27 of the top light shield forms the upper trim edge for the central panel 12. Pivoted sections 28 mounted in recesses in opposite edges of the top light shield 19 are each urged outwardly by a spring 29 (Figure 7). The spring 29 is preferably made of Phosphor bronze and is turned around the pivot of the section 28 with one end fitting against the rear of the recess and the other end pressing against the inner edge of the section 28, so that as the top light shield is moved forwardly from its retracted position the sections rotate outwardly to extend the top light shield laterally and thereby increase its planar area. The amount of lateral extension depends upon the distance the top light shield is pulled out from the front of the cabinet. The front of the central panel 12 projects forwardly of the rest of the front wall 6 of the cabinet and the forwardly projecting ledges 30, which are beveled on their inner edges, as shown at 31, act as confining edges for the pivoted sections 28. When the top light shield 19 is in its fully extended position, the pivoted sections 28 are pressed outwardly to the full lateral extension permitted by the beveled edge 31. Inward movement of the top light shield causes the pivoted sections 28 to be moved into the recesses by the beveled edges 31.

At each side of the front panel 12 is a recess containing a fan shaped bellows 32 in collapsed condition. The rear edge of the bellows is secured to the bottom of the recess and the front edge to a trim member 33 which covers the recess when the bellows is collapsed or retracted and co-operates with the top rim 27 to frame the center panel 12. The trim 33 does not extend the entire height of the cabinet, but the uniform appearance is maintained by corresponding trim members 34 which extend from the bottom of the trim 33 to the bottom of the cabinet.

The top of the trim 33 is hinged to the front panel 12 directly beneath the top light shield. To use the bellows 32 as a side light shield the trim 33 is grasped adjacent a finger notch 35 (Figure 2) and rotated upwardly about its pivot. The friction of the hinge will keep it in place in any position of angular extension. The side light shields can be extended a sufficient amount so that the trim 33 will meet the underside of the pivoted section 28 if the top light shield is extended. The bottom of the outside edge of the pivoted sections 28 may be provided with a thin strip of rubber or felt to provide a light proof joint between the side light shield and the top light shield. If desired, any suitable latching means, such as a spring catch, can be used to latch the trim 33 to the pivoted section 28. It is also possible for the side members, instead of being made of bellows, to be made of collapsing sector shaped sections which interlock in the extended position.

Figure 3:
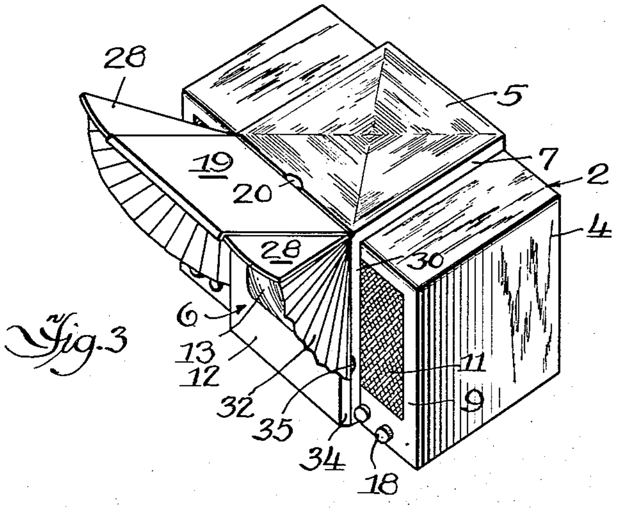
Figure 3 is another perspective view of the same receiver with the top light shield and the side light shields fully extended.

The side light shield extends outwardly at an angle of approximately 115 or 120° from the front of the cabinet so as not to restrict the useful angle of vision. When the top and both side light shields are extended, as shown in Figure 3, the image exhibiting member is amply protected from extraneous light and a satisfactory viewing of the screen may be had even in a brightly lighted room. Each of the three light shielding members may be used independently of the others if only partial light shielding is desired, and they may be used in any desired degree of extension.

In Figure 8 the laterally extending portions 28 are replaced by a bellows section 36 which has one edge secured in the recess 37 in the edges of the top light shield 38. The other edge of the bellows is secured to a trim member 39. A spring hinge 40 exerts constant force urging the trim member 39 outwardly so that the bellows section is automatically expanded as the top light shield is moved towards the extended position and the trim member 39 passes the beveled edge 31.

In the embodiment of the invention illustrated in Figure 9 the top light shield 41 is hinged to the top 42 of the cabinet, as indicated at 43, and fits into a flat recess 44. The recess is of the same depths as the thickness of the member 41 so that when the light shield is swung back into its retracted position it will be flush with the cabinet top. A finger notch 45 is provided in the top edge of the portion of the cabinet top abutting the recess 44 to facilitate lifting the top light shield out of its retracted position. The hinges 43 have sufficient friction to hold the top light shield 41 in any position of angular adjustment to which it may be moved and is preferably provided with a positive stop to prevent the top light shield from moving beyond about 155° from its retracted position. This stop means will cause the top light shield to be elevated about 25° above the horizontal when it is in its extended position so that it will not reduce the useful angle of vision when it is functioning as a light shield.

The sections 46 are similar to the pivoted sections 28 and are moved outwardly in the same manner when the top light shield is moved out of the recess 44. The forward edges of the recess 44 are beveled, as indicated at 47. The sections 46 are moved into the recesses in the edges of the member 41 as they engage the beveled edges when the top is swung back into retracted position.

Figure 11:
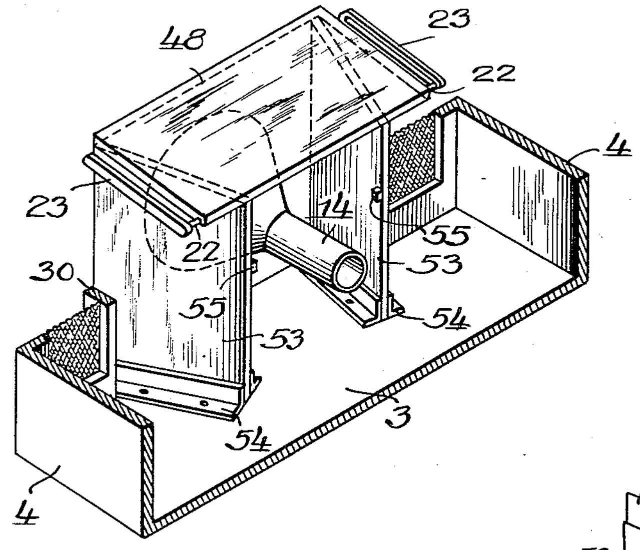
Figure 11 is a perspective view of the structure of Figure 10 with the television apparatus removed and the upper portion of the cabinet walls cut away to facilitate illustration of the interior of the cabinet structure.
Figure 12:
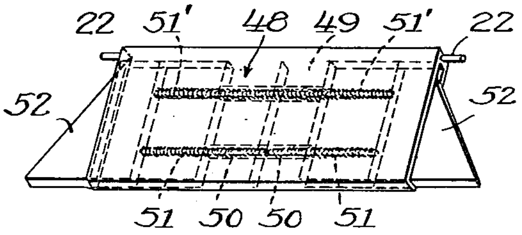
Figure 12 is a detail perspective view of the top light shield of Figures 10 and 11 with the interior structure shown in dotted lines.

In the embodiment of the invention illustrated in Figures 10 to 14, inclusive, the cabinet is of substantially the same design as illustrated in Figure 1 and differs therefrom only in the construction of the light shields. The top light shield 48 differs from the top light shield 19 chiefly in the manner of extending the expanding sections. In Figure 12 the member 48 is shown as having a solid center section 49 having a plurality of recesses 50 which act as guides for the coiled springs 51 secured therein. The outer ends of the springs 51 encircle guide pins 51′ which are secured to the inside edges of linearly sliding sections 52. The springs cause sections 52 to move outwardly in their recesses as the outside edges of the sections pass the beveled edges 31. The edges 31 constitute retaining barriers for sections 52 the same as for the sections 28. The outer edges of the sections 52 may be provided on their under surface with a thin layer of rubber or felt to prevent light from entering between them and the top of the side light shields at their meeting edges when the top and side light shield members are in their extended positions.

The side light shields comprise a pair of members 53 each vertically mounted in a slide channel 54 secured to the base 3 at an angle of approximately 65° from the front 12. The members 53 are slidable in the channels 54 and diverge as they are slid through openings in the front adjacent each edge of the central panel 12. Stops 55 prevent the side light shields from moving outwardly too far. When the side light shields are in their retracted position the front edges 56 are flush with the front of the cabinet and form part of the trim around the central panel 12 harmonizing with the trim 57 at the top of the panel formed by the front edge of the top light shield 48 when in retracted position.

Figure 13:
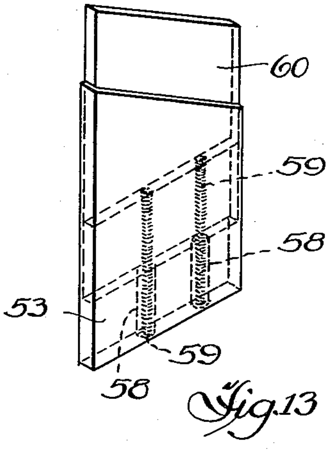
Figure 13 is a detail perspective view of the side light shield of Figures 10 and 11 with the interior structure shown in dotted lines.

As shown in Figure 13, the solid bottom portion of each member 53 has a plurality of recesses 58 which act as guides for coiled spring 59 secured therein. A linearly sliding section 60 is secured in a recess in the top of each member 53. Guide pins 61 projecting downwardly from the bottom edge of section 60 fit within the coiled springs 59. The springs 59 move the section 60 upwardly as the side shield member 53 is moved outwardly into light shielding position. Some portion of the top edge of movable section 60 is always in contact with a portion of the lower surface of top light shield member 48. Accordingly the lower surface member 48 constitutes the confining edge for movable section 60.

Figure 14:
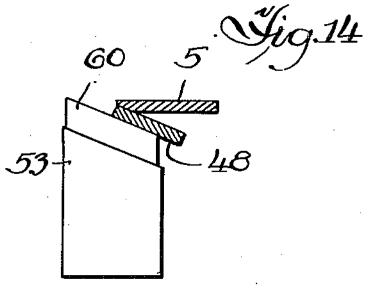
Figure 14 is a fragmentary sectional view showing the interengagement of the side light shield extension with the top light shield.

As the top and side light shield members move outwardly from the retracted position of Figure 11, the sliding sections move out of their recesses. The amount of extension of the sliding sections is substantially proportionate to the amount the light shield member has itself been extended. In Figure 14 the side shield 53 is extended about one-half the distance of its total travel and its sliding section 60 is correspondingly at about one-half of its total extension. This is true regardless of the position of the top light shield member.

The advantage of this type of light shield shown in Figures 10 to 14 inclusive is that this type of expanding section provides a shield whose forward edge is substantially straight rather than one which curves near its lateral edges. Also, the side shield members are longer and provide more adequate side light shielding. Further, this type of three sided shield is substantially a complete shield at any degree of extension due to the proportionality between the sliding section extension and the travel of the light shield member. The angular relationship between the light shield members and the image exhibiting member is such as to provide adequate light shielding and still permit viewing of the image exhibiting member within the full useful angle of vision.

Although the illustrations in this application are of the direct viewing type of television receiver and the accompanying description is written for this type of receiver, it will be obvious that the principles involved, of providing extensible light shielding without restricting the useful angle of vision, also apply to the projection, reflecting and other types of television receivers, as well as to oscilloscopes and to other types of viewing apparatus such as slide viewers and projectors with self-contained screens.

I have described a few embodiments of my invention in considerable detail, but it will be understood that the description is intended to be illustrative, rather than restrictive, as many details may be modified or changed without departing from the spirit or scope of my invention. Accordingly, I do not desire to be restricted to the exact details described, except as limited by the appended claims.

I claim:

1. In a cabinet containing an image exhibiting member, a light shield movable forwardly of said image exhibiting member to light shielding position relative thereto, and means automatically expanding said light shield laterally in the plane in which it is moved, at an angle to the direction of said movement, thereby increasing the planar area of said light shield when it is moved into light shielding position.

2. In a cabinet containing an image exhibiting member, a pair of side light shields and a top light shield, each of said sidelight shields being movable forwardly of said image exhibiting member in a plane diverging from the plane of said other side light shield, the angle of each of said planes being obtuse relative to the plane of said image exhibiting member, auxiliary light shielding sections secured to said top light shield, and spring means operable to move said auxiliary sections outwardly to expand the effective light shielding area of said top light shield in a lateral direction as said top light shield is moved forwardly of said image exhibiting member.

3. In a cabinet containing an image exhibiting member, a pair of side light shields movable forwardly of said image exhibiting member in diverging planes, a top light shield movable forwardly of said image exhibiting member, a pair of auxiliary light shielding sections pivoted to said top light shield, and spring means operable to move said auxiliary sections pivotally relative to said top light shield as said top light shield is moved forwardly of said image exhibiting member, the outer edges of said auxiliary sections engaging the upper ends of the adjacent side light shields when said side light shields and said top light shield are moved forwardly of said image exhibiting member to the same extent.

4. In a cabinet containing an image exhibiting member, a light shield having a recess in one edge, and an auxiliary section mounted in said recess, said light shield being movable between a retracted and a light shielding position, and spring means operable to automatically move said auxiliary section outwardly from said recess a predetermined distance in the plane of said light shield when said light shield is moved to light shielding position, said auxiliary section moving into said recess when said light shield is moved to retracted position.

5. In a cabinet containing an image exhibiting member, a top light shield movable forwardly of said image exhibiting member, a pair of recesses in the opposite lateral edges of said top light shield, an auxiliary section pivoted in each of said recesses, spring means operable to move said auxiliary sections automatically outwardly of said recesses in the plane of said light shield when said light shield is moved forwardly, said auxiliary sections being movable into said recesses when said top light shield is moved rearwardly.

6. In a cabinet containing an image exhibiting member, a light shield comprising a top member and a plurality of side members, each of said members being movable to either a light shielding or a retracted position, and expanding means in each of said members, said expanding means extending said top member laterally and said side members vertically to increase the area of light shielding surface of each member as it is moved to light shielding position.

7. In a cabinet containing an image exhibiting member, a light shield comprising a plurality of members each being retractable and extensible relative to said cabinet, each of said light shield members having its forward edge substantially flush with the front surface of said cabinet when in retracted position, at least two of said light shield members being extensible forwardly of said image exhibiting member in diverging directions, and spring means for expanding one of said diverging light shield members vertically in extended position to meet one of said other light shield members.

8. In a cabinet containing an image exhibiting member, a top light shield, a recess in each lateral edge of said top light shield, an auxiliary section pivotally mounted in each of said recesses, said top light shield being slidable between a retracted position within said cabinet and an extended position forwardly of said cabinet, and spring means in each of said recesses moving said auxiliary sections outwardly of said recesses when said top light shield is moved to its extended position, said auxiliary sections being pushed into said recesses by the edges of adjacent cabinet members when said top light shield is slid rearwardly towards its retracted position.

9. In a cabinet containing an image exhibiting member, a top light shield provided with auxiliary sections automatically moved laterally to extended position in which they increase the light shielding area of said top light shield when it is moved to light shielding position, and a pair of side light shields angularly extensible to positions forwardly of said image exhibiting member, said light shields co-operating to shield said image exhibiting member from extraneous light while permitting viewing of said image exhibiting member within substantially its full useful angle of vision.

10. In a cabinet containing an image exhibiting member, a light shield for said image exhibiting member comprising two side members, one on each side of said image exhibiting member, and a top member, said light shield members being slidable into retracted position within said cabinet or to light shielding position forwardly of said cabinet, a recess in the top edge of each of said side members and in each lateral edge of said top member, an auxiliary section mounted in each of said recesses, and spring means in each of said recesses moving said auxiliary sections outwardly upon movement of said side and top members to light shielding position.

11. In a cabinet containing an image exhibiting member, a plurality of light shield members each slidable into retracted position within said cabinet or to light shielding position forwardly of said cabinet, an auxiliary section secured to each of said light shield members, spring means moving each of said auxiliary sections outwardly of its light shield member as said light shield member is slid towards light shielding position, and means pushing each of said auxiliary members inwardly of its light shield member as said light shield member is slid towards retracted position.

References Cited in the file of this patent

UNITED STATES PATENTS

| | | |
|---|---|---|
| 2,299,393 | Johnson | Oct. 20, 1942 |
| 2,368,882 | Rose | Feb. 6, 1945 |
| 2,438,256 | Stein | Mar. 23, 1948 |
| 2,496,752 | Rose | Feb. 7, 1950 |
| 2,604,536 | Rose | July 22, 1952 |